United States Patent
Liebl et al.

(10) Patent No.: US 7,430,465 B2
(45) Date of Patent: Sep. 30, 2008

(54) OPEN-ENDED PC HOST INTERFACE FOR VEHICLE DATA RECORDER

(75) Inventors: Troy Liebl, Owatonna, MN (US); Manokar Chinnadurai, Owatonna, MN (US); Matthew Jordison, Blooming Prairie, MN (US)

(73) Assignee: SPX Corporation, Charlotte, NC (US)

( * ) Notice: Subject to any disclaimer, the term of this patent is extended or adjusted under 35 U.S.C. 154(b) by 743 days.

(21) Appl. No.: 10/989,503

(22) Filed: Nov. 17, 2004

(65) Prior Publication Data

US 2006/0106514 A1    May 18, 2006

(51) Int. Cl.
*G01P 1/12* (2006.01)
*G01M 17/00* (2006.01)

(52) U.S. Cl. ...................................... 701/35
(58) Field of Classification Search ............... 701/35
See application file for complete search history.

(56) References Cited

U.S. PATENT DOCUMENTS

| | | | |
|---|---|---|---|
| 2,640,968 A | 6/1953 | Lehr | 339/66 |
| 4,392,661 A | 7/1983 | Langenstein | 280/12 M |
| 4,924,039 A | 5/1990 | McAllise et al. | 191/12.2 |
| D322,582 S | 12/1991 | Friedman | 10/70 |
| 5,473,540 A * | 12/1995 | Schmitz | 701/1 |
| 6,362,421 B1 | 3/2002 | Layton, Jr. | 174/50 |
| 6,393,342 B2 * | 5/2002 | Bauer et al. | 701/1 |
| 6,405,112 B1 * | 6/2002 | Rayner | 701/35 |
| 6,438,472 B1 * | 8/2002 | Tano et al. | 701/35 |
| 6,462,270 B1 | 10/2002 | Depp et al. | 174/50 |
| 6,476,320 B1 | 11/2002 | Ritter et al. | 174/66 |
| 6,515,226 B2 | 2/2003 | Chiriku et al. | 174/50 |
| 6,539,358 B1 | 3/2003 | Coon et al. | 704/275 |
| 6,586,674 B2 | 7/2003 | Krause et al. | 174/50.5 |
| 6,633,482 B2 | 10/2003 | Rode | 361/686 |
| 6,816,760 B1 * | 11/2004 | Namaky | 701/29 |
| 6,848,916 B2 | 2/2005 | Nakayama et al. | 439/76.2 |
| 6,881,899 B1 | 4/2005 | Trangsrud | 174/50 |
| 6,916,985 B1 | 7/2005 | Harwood | 174/38 |
| 6,939,155 B2 | 9/2005 | Postrel | 139/297 |
| D519,859 S | 5/2006 | Chinnadurai et al. | 10/46 |
| 7,079,927 B1 * | 7/2006 | Tano et al. | 701/35 |
| 7,155,322 B2 * | 12/2006 | Nakahara et al. | 701/35 |
| 7,208,685 B2 | 4/2007 | Browning et al. | 174/544 |
| 7,239,945 B2 * | 7/2007 | Hiemer et al. | 701/29 |
| 2001/0044677 A1 * | 11/2001 | Bauer et al. | 701/1 |
| 2006/0106514 A1 * | 5/2006 | Liebl et al. | 701/35 |

* cited by examiner

*Primary Examiner*—Thomas G. Black
*Assistant Examiner*—Shelley Chen
(74) *Attorney, Agent, or Firm*—Baker & Hostetler LLP (57) ABSTRACT

An apparatus and method is provided that allows a host workstation to communicate with all types of VDR available to a user to record events in a vehicle type selected by the user. The host workstation can also alert the user when the incorrect VDR is connected based upon the vehicle selection by the user. Once connected, the host workstation can configure the VDR for the desired recording parameters.

25 Claims, 4 Drawing Sheets

OPEN-ENDED PC HOST INTERFACE FOR VEHICLE DATA RECORDER

FIELD OF THE INVENTION

The present invention relates generally to an apparatus and method for to interact with diagnostic tools. More particularly, the present invention relates to software on a host computer that interacts with a Vehicle Data Recorder (VDR).

BACKGROUND OF THE INVENTION

When a problem arises in a vehicle, such as an automobile, the owner takes the automobile to a service station or a garage for a mechanic to diagnose the problem. If the problem occurs frequently or occurs at the service station, then the mechanic can diagnose the problem with the diagnostic tools on site. However, the problem can be intermittent and may not occur when the vehicle is at the service station, thus the mechanic may not be able to diagnose the problem. If the mechanic cannot diagnose the problem while the vehicle is at the service station, the owner can become frustrated because the problem still exists and he has taken time off from work in order to bring the vehicle for service. Further, the owner will have to take additional time off to bring the vehicle back for servicing when the intermittent problem occurs again. This scenario can be repeated many times before the problem is properly diagnosed.

An intermittent problem or event may be a spark plug in one of the vehicle's cylinder that does not fire properly when the vehicle hits a bump in the road at certain speeds causing the vehicle to lose power. The event does not occur every time the vehicle hits a bump, but does occur enough that the owner is frustrated. Further, should the intermittent problem occur when the vehicle is in the middle of an intersection, the driver may cause an accident due to loss of power during acceleration across a crowded intersection. However, since the event may not be recreated at the service station or when the mechanic takes the vehicle for a test drive, it will be difficult for the mechanic to diagnose the problem.

A vehicle data recorder (VDR) is used to record such events when they occur. The VDR is a self-contained modular unit that easily connected to a vehicle. It will monitor and record diagnostic data from the vehicle's computer (Electronic Control Unit or ECU) so that when the event occurs, the data from the event can be recorded and later viewed by the user. Once the data from the event is recorded by the VDR, the mechanic can download the data into a host computer and diagnose the problem.

Host computers have been used to communicate with the VDR to transfer data to and from the VDR, however, the host computers typically have only the software to interact to a specific VDR. Thus, for a different VDR, the user has to load up the software for that VDR in order to interact with it.

Accordingly, it is desirable to provide an apparatus and method that can include a software that can interact with different types of VDR without having to stop and load the correct software for that particular VDR.

SUMMARY OF THE INVENTION

The foregoing needs are met, to a great extent, by the present invention, wherein one aspect of an apparatus is provided that in some embodiments includes a VDR that communicates in CAN communication protocol with a vehicle's computer.

In accordance with one embodiment of the present invention, is a software recorded on a computer readable medium capable of causing a host workstation to perform steps is provided and includes selecting a type of vehicle by a user that a user wants to record an event, instructing the user the type of vehicle data recorder with proper communication protocols to connect to the host workstation and an electronic control unit based on the selected vehicle, detecting if the vehicle data recorder is attached to the host workstation, querying the vehicle data recorder with a tool identification command to identify if the correct type of vehicle data recorder is attached to the host workstation, and configuring the vehicle data recorder to record a desired event. The software can detect if the vehicle data recorder is attached manually, by user input, or automatically, through communication between the host workstation and the vehicle data recorder. The software also can send a tool connection error signal to the host workstation when the vehicle data recorder is not properly connected to the host workstation or can send a vehicle data recorder type error signal to the host workstation when the software detects that the incorrect type of vehicle data recorder is attached based on the vehicle selection. The software can further configure the vehicle data recorder by configuring to perform at least one of the following: recording data for a predetermined period of time, recording data when a trigger button is actuated by the user, recording data for a period of time before and after the trigger is actuated by the user, any other time period and a combination thereof. While querying, the software can communicate with any type of vehicle data recorder that can communicate with any communication protocol communicated by the electronic control unit on a vehicle. The host workstation can be a computer device such as a personal computer, a personal digital assistant, a scan tool, or any device that is capable of communicating with the vehicle data recorder. The software can further send vehicle data recorder type error signals to the host workstation which informs the user the correct type of vehicle data recorder to attach to the host workstation.

In accordance with another embodiment of the present invention, a method of communicating with a vehicle data recorder is provided and includes selecting the desired vehicle type by a user that the user wants to record an event, instructing the user the vehicle data recorder type equipped with proper communication protocols to connect to a host workstation and to an electronic control unit based on the selected vehicle type, detecting a connection between the vehicle data recorder and the host workstation, querying the vehicle data recorder with tool identification command to identify the type of vehicle data recorder attached to the host workstation, and configuring the vehicle data recorder to record a desired event. Detecting a connection between the vehicle data recorder and the host workstation can be done manually, by user input, or automatically, through communication between the two. The method of communicating can include sending a tool connection error signal to the host workstation when the vehicle data recorder is not properly connected to the host workstation. The method can further configure the vehicle data recorder by either recording data for a predetermined period of time, recording data when a trigger button is actuated by a user, recording data for a period of time before and after the trigger is actuated by the user, any other time period or a combination thereof. While querying for tool identification, the software can communicate with any type of vehicle data recorder that can communicate with any communication protocol communicated by the electronic control unit on a vehicle. The method can further include a host workstation which is a computing device, such as a personal computer, a personal digital assistant, a scan tool, or any device that is capable of communicating with the vehicle data recorder.

In accordance with yet another embodiment of the present invention, a host workstation is provided and can include an input device to input information from a user, an output device to communicate information, a communication port to communicate with an external device, a memory to store information and a storage device to store information. The host workstation also can include a processor that is in communication with the storage, input and output devices, the communication port and the memory, such that the host workstation is capable of performing functions such as selecting the desired vehicle type that the user wants to record an event, instructing the user the vehicle data recorder type equipped with proper communication protocols to connect to the host workstation based on the selected vehicle type, detecting for a connection between the vehicle data recorder and the host workstation, querying the vehicle data recorder with tool identification command to identify the type of vehicle data recorder attached to the host workstation, and configuring the vehicle data recorder to record a desired event. Detecting a connection between the vehicle data recorder and the host workstation can be done manually, by user input, or automatically, through communication between the two, and if the vehicle data recorder is not properly connected to the host workstation, it sends a tool connection error signal to the host workstation. The host workstation further configures the vehicle data recorder either by recording data for a predetermined period of time, recording data when a trigger button is actuated by a user, recording data for a period of time before and after the trigger is actuated by the user, any other time period or a combination thereof. When querying, the software can communicate with any type of vehicle data recorder that can communicate with any communication protocol communicated by the electronic control unit on a vehicle. The host workstation can be a computing device, such as a personal computer, a personal digital assistant and a scan tool, or any device that is capable of communicating with the vehicle data recorder.

In accordance with still another embodiment of the present invention a method of communicating with a vehicle data recorder is provided and can include selecting the desired vehicle type by a user that the user wants to record an event, instructing the user the vehicle data recorder type equipped to connect to a host workstation based on the selected vehicle type, automatically detecting a connection between the vehicle data recorder and the host workstation, automatically querying the vehicle data recorder with tool identification command to identify the type of vehicle data recorder attached to the host workstation, automatically selecting the software module that communicates with the vehicle data recorder, and automatically configuring the vehicle data recorder to record a desired event. The method of communicating further selects the recording parameter based on user preference.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a software on a host workstation that can interface with various VDRs.

Figure 1:
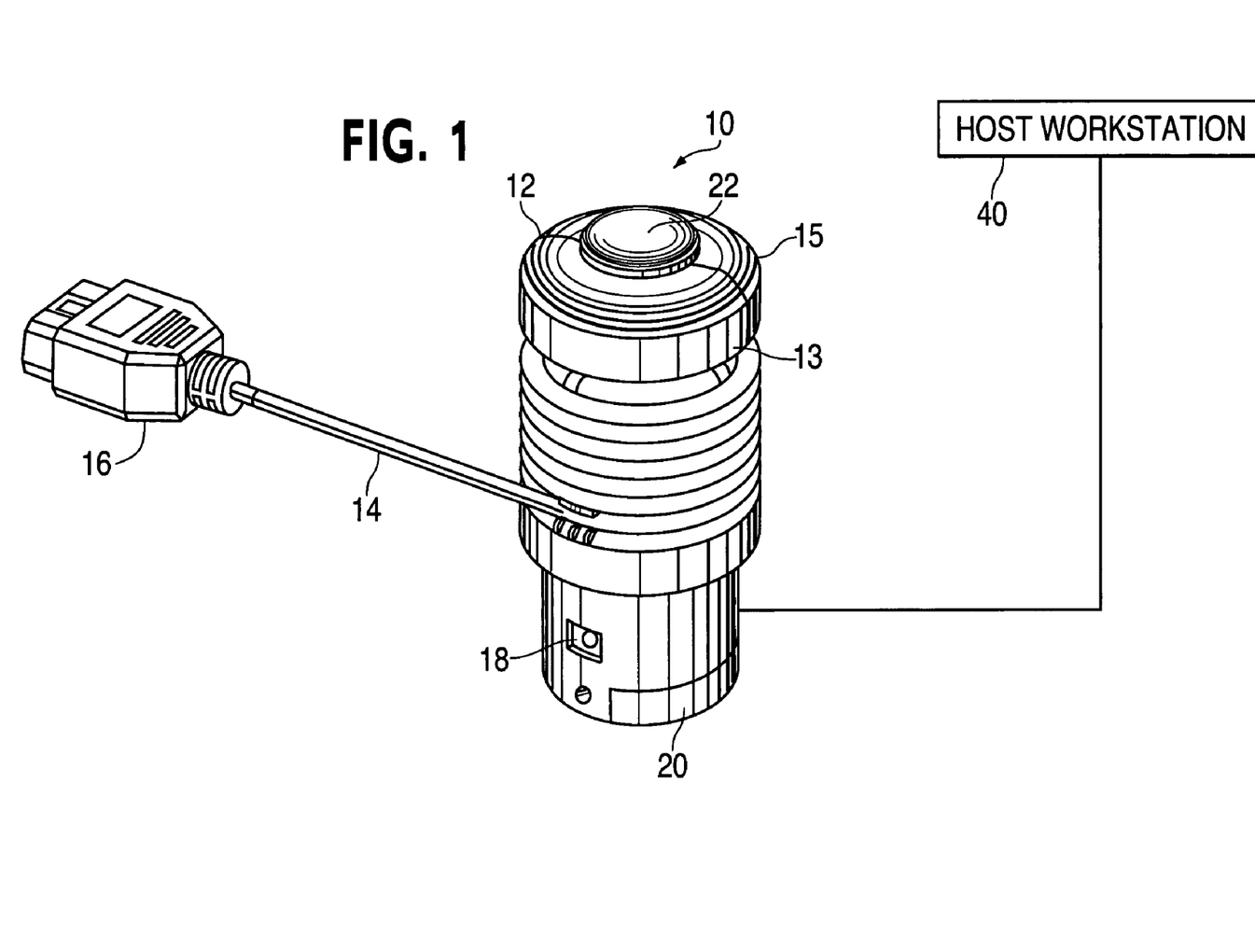
FIG. 1 is a perspective view of a VDR capable of CAN communication connected with a host workstation.

An embodiment of the present inventive apparatus and method is illustrated in FIG. 1, which is a perspective view of a VDR 10 connected to a host workstation 40. This VDR 10 is capable of CAN communication, but a person skilled in the art will recognize that the present invention can be adapted to work with any VDR. VDR 10 includes a housing 12, an integrated vehicle 10 cable 14 with a J1962 male connector 16 to communicate with the vehicle's computer (ECU), a power connector 18, a communication port (not shown), a cover 20 that covers an optional card connector and a trigger button 22 with LED illumination.

The housing 12 covers the internal components (described below) and can include a first 13 and second parts 15 for easy assembly. The housing 12 can be any shape but is preferably cylindrical in shape. The trigger button 22 is located on the top portion of the VDR and can be any shape, but preferably is cylindrical in shape. The trigger button 22 when depressed will cause the VDR to record the vehicle data information so that the data related to the event can be captured. The VDR can be programmed to record data for a period of time before and after the trigger button 22 is depressed, record data for a period of time without the user's intervention, record only when the trigger button is actuated and stops recording when the trigger button again actuated, record for any other time period desired by the user, and a combination thereof. The data can be downloaded later to the host workstation 40 for the user to review the data from the event. The trigger button 22 can be illuminated by LED so that the VDR 10 can be used in dark environmental conditions. The LED can remain steady so that the user can easily locate the VDR in the dark and can be flashing when the event data is being recorded. It will be recognized by a person skilled in the art that the trigger button 22 can be located anywhere on the outside surface of the The cable 14 with the J1962 male connector 16 provides communication between the ECU and the VDR. The cable 14 can be any length so long as its length is long enough for the user to connect the VDR to the ECU. When not in use, the cable can be wrapped around the housing 12 for easy storage. The J1962 male connector 16 connects to its complementary female connector on the ECU. The J1962 male connector 16 allows the VDR to collect data from the ECU in various communication protocols.

The power connector 18 is used when the VDR is not connected to the vehicle, such as when the data contained therein is being downloaded to the host workstation 40. The host workstation 40 can be any computing device that can communicate with a vehicle data recorder, such as a computer, personal digital assistant (PDA) or a scan tool. The host workstation can have various components, such as an output device or display, an input device for user input, a communication port to communicate with external devices, such as the VDR, a memory, a storage device for storing information and a processor in communication with the aforementioned components. The host workstation is loaded with software that can communicate with any available VDR and is further discussed below.

Information between the VDR and the host workstation can be exchanged via the communication port, which can include a RJ-45 jack. It will be recognized by a person skilled in the art that the communication port can communicate via a wired connection such as the RJ-45, but can also communicate via wireless connection. Wireless connection can be any wireless communication protocol such as Wi-Fi, BLUETOOTH, radio frequency, infrared, and others forms of wireless communication.

The cover 20 covers the optional card connector (discussed below). The cover 20 is removably attached for easy access to the optional card connector. The optional card can update and add software, other information and hardware to the VDR.

Figure 2:
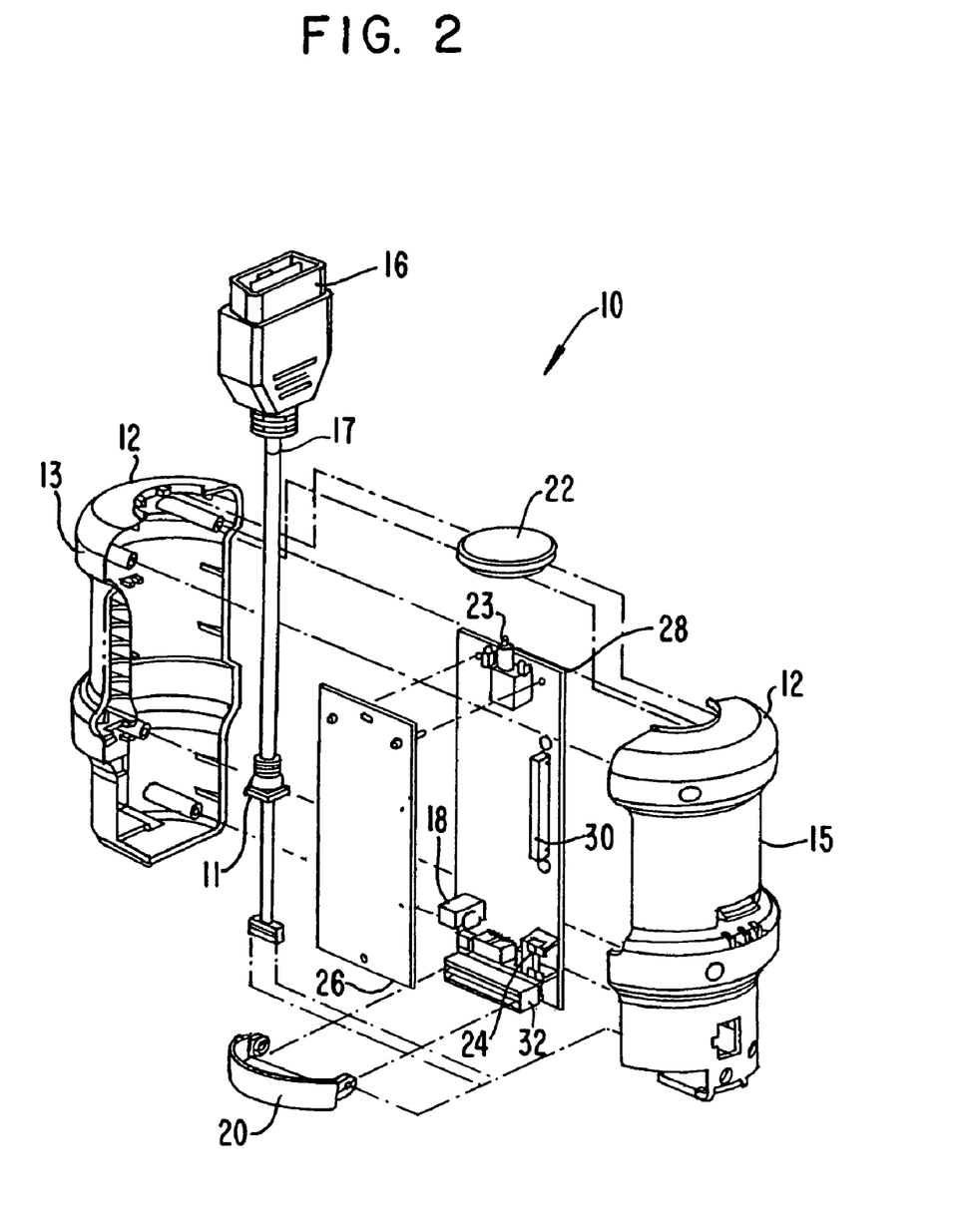
FIG. 2 is the exploded view of the VDR's external and internal components.

FIG. 2 is the exploded view of the VDR's 10 external and internal components. The internal components are contained in the housing 12, which includes the first 13 and second 15 parts. The first part 13 includes an opening for the power connector 18 to connect to an external power source. When the VDR is used in the vehicle, it can be powered by the battery of the vehicle via the J1962 male connector 16 and when the data from the VDR is being downloaded to the host workstation, the external power source is utilized or when needed by the user. The second part 15 includes an opening for the communication port 24 so that information can be exchanged with the VDR and the host workstation. The first 13 and second 15 parts have a top portion that receives the trigger button 22 and a bottom portion that receives the cover 20.

The cable 14 includes a first end 11 that is connected to a main board 28 and a second end 17 that is connected to the J1962 male connector 16. The J1962 male connector 16 connects to its complementary female connector on the vehicle's ECU. The J1962 male connector 16 includes various pins that can communicate with various communication protocols in a vehicle.

The main board 28 and a second board 26 are coupled together and communicate with each other via a high density board-to-board connector 30. The main board 28 and the second board 26 can also be coupled together by pins. The main board 28 includes a vehicle I/O, a real-time clock, the power connector 18, a trigger switch 23, and other interface connectors, such as the optional card connector 32, and the communication port 24. The optional card connector 32 connections with an option card (discussed below), which can be used to update the VDR with new communication protocols, pin assignments, software, hardware, and configurations for a Field Programmable Gate Array (FPGA), The trigger switch 23 is actuated by the user when he depresses the trigger button 22 and data from the vehicle is recorded. The second board 26 contains the processor, memory, and protocol controllers (discussed below). Although three cards (main and second boards and option card) are discussed herein, one skilled in the art will recognize that additional cards and components or less cards and components are possible depending on the needs of the user.

Figure 3:
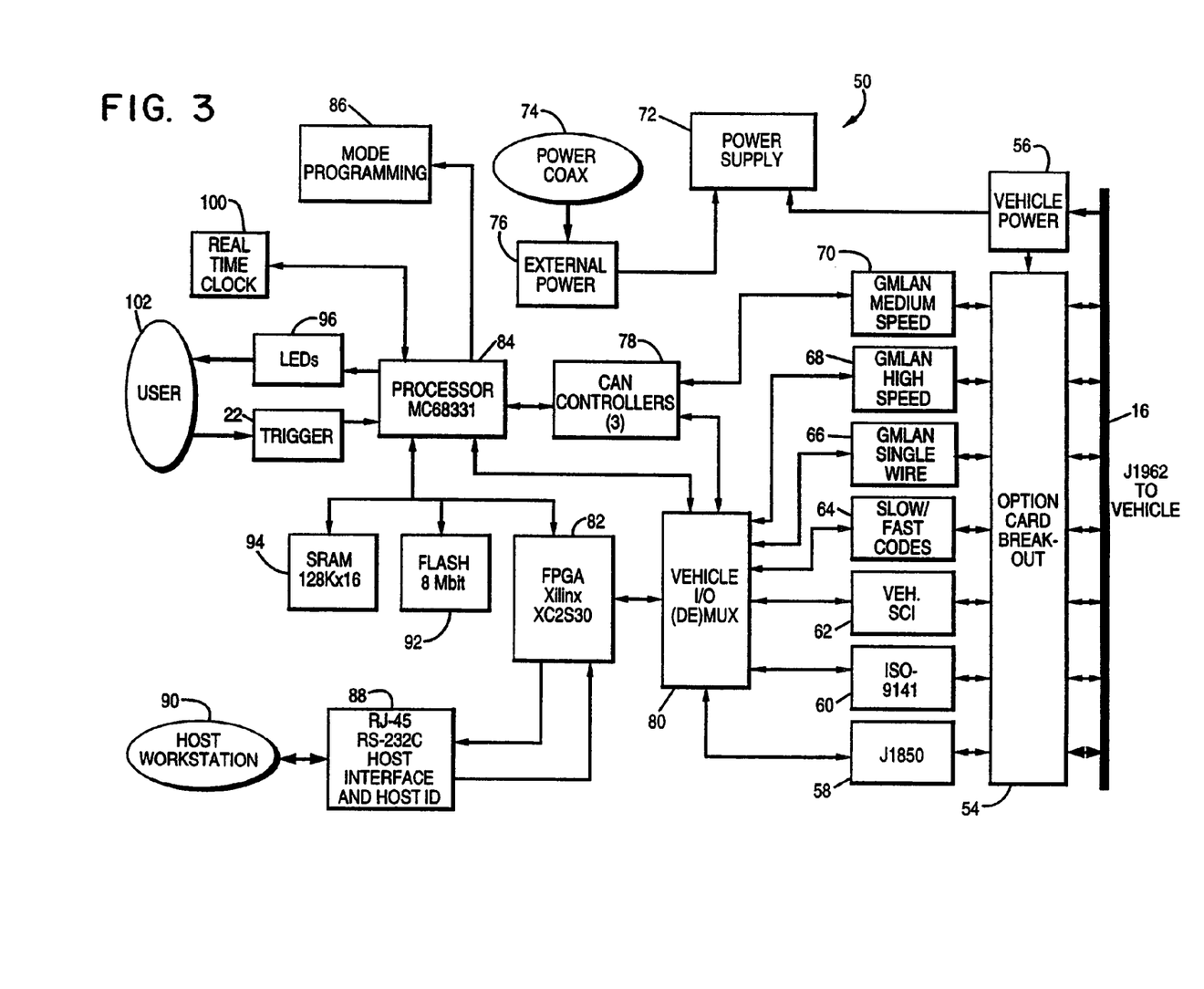
FIG. 3 is a functional block diagram of the VDR connected to the host workstation.

FIG. 3 is a functional block diagram 50 of an embodiment of the VDR. The J1962 male connector 16 can be connected to the ECU so that the VDR can collect diagnostic data from the vehicle. The J1962 male connector 16 includes various pins that mate with complementary pins in the ECU. The pins relay communication protocols that carry diagnostic data and instructions to and from the vehicle. The pins are assigned depending on the communication protocol of the vehicle and are known in the art.

The option card 54 provides flexibility to the VDR by allowing the VDR to support new communication protocols, pin assignments, software, information, hardware, and configure the FPGA. Additionally, the option card 54 can also act to simply pass through the communication protocols, if desired. All communication protocols hardware circuits 58, 60, 62, 64, 66, 68, 70 can communicate with the option card 54. The option card allows flexibility for pin swapping, pin reconfiguration or additional pins to adapt to various current and new communication protocols. A multiplexer can be added to provide additional circuits for signal communication.

The VDR and the option card 54 can be supplied with power via vehicle power 56 and this allows the option card 54 to have active components thereon. Active components include new protocol transceivers to communicate in the new communication protocols. Additional processor 84, FPGA 82, memories 92, 94, can be added to the VDR via the option card 54 to increase processing power and memory storage. Should additional power is needed for the VDR and its components, additional power supply and conditioners can also be added with the option card 54.

Wired data transfer ports (serial, parallel, USB (Universal Serial Bus), Fire Wire (IEEE 1394) and others) and wireless data transfer ports for wireless communication (Wi-Fi, BLUETOOTH, Infrared, Radio Frequency and other wireless communication protocols) can also be added to the VDR via the option card 54. The option card 54 can include the appropriate wireless communication transmitters and receivers thereon so that wireless communication can occur.

Software updates can be added to the memories, the processor 84 and FPGA 82 such as new firmware, software to communicate with new communication protocols, software to run new hardware, software to reconfigure the FPGA, software to update mode programming or new procedures. It will be recognized by a person skilled in the art that additional hardware and software can be added in the future without departing from the scope of the option card 54. The option card 54 is inserted into the option card connector 32 and can be protected by the cover 30. To replace the option card 54 with a new option card, the cover 30 can be removed and the old option card can be removed and a new one inserted. Once completed, the cover 30 can be left off or reattached to the VDR.

When the VDR is being used in the vehicle, it can be powered by the vehicle power 56 that supplies power to a power supply 72. The vehicle power 56 can be provided through the J1962 male connector 16 when it's hooked up to the vehicle's computer. Alternatively, power coax 74 can be used to supply external power 76 to the power supply 72 when the VDR is outside of the vehicle, such as when it is downloading event data to the host workstation or as otherwise needed by the user.

The communication protocols and hardware include J1850 (58), ISO 9141 (60), Vehicle SCI 62 (Serial Communication Interface), Slow/Fast Codes 64, GMLAN Single Wire 66, GMLAN high speed 68, and GMLAN medium speed 70. The J1850 (58) is a multiplexed communication protocol that can be further divided into Variable Pulse Width (VPW) and Pulse Width Modulation (PWM). PWM typical communication speed is about 41.6 kbps and is a two wire balanced signal, while VPW typical communication speed is about 10.4 kbps and is a one signal wire. This protocol is used for diagnostic and data sharing purposes and can be found in engine, transmission, ABS, and instrumentation applications.

ISO 9141 (60) is either a single wire (K line only) or a two wire (K and L line). The K line is bidirectional and conveys address information and data with the ECU. The L line is unidirectional and is only used during initialization with the ECU. This protocol is implemented on 1996 and newer vehicles.

GMLAN is a family of serial communication buses that allows ECUs to communicate with each other or with a diagnostic tester. There are three types of buses, a dual wire high speed bus (GMLAN high speed) 68, a dual wire medium speed bus (GMLAN medium speed) 70, and a single wire low speed bus (GMLAN single wire) 66. The GMLAN high speed 68 (500 kbps) is typically used for sharing real time data such as driver commanded torque, actual engine torque, steering angle, etc. The GMLAN medium speed 70 (up to 250 kbps) is typically used for applications (display, navigation, etc.) where the system's response time demands that a large amount of data be transmitted in a relatively short amount of time, such as updating a graphics display. The GMLAN single wire 66 (33.33 kbps) is typically used for operator controlled functions where the system's response time requirements are in the order of 100-200 msecs. This bus also supports high speed operation at 83.33 kbps used only during ECU reprogramming. The decision to use a particular bus in a given vehicle depends upon how the feature/functions are partitioned among the different ECUs in that vehicle. GMLAN buses use the CAN communications protocol for relaying information.

Slow/Fast Codes can be found in GM vehicles and is a serial communication protocol. Some examples include GM Dual Baud, GM10, GM30, Master, Normal, Unidirectional and others. The serial baud transmission rate can be about 160 kbps to about 9600 kbps for Fast Codes. Slow Codes are used by grounding a Slow Code diagnostic pin in the vehicle diagnostic connector of the ECU, which forces the vehicle to display error codes via the check engine light. The user counts the number of blinks of the check engine light to represent an error code and decipher the code with a code manual.

Vehicle SCI 62 allows communication of data in a one-wire serial method between the tool and the ECU. The transmission rate is about 62.5 kbps. GM vehicles through 1995 use the UART (Universal Asynchronous Receiver/Transmitter is responsible for performing the main task in serial communications with computers), which makes use of this Vehicle SCI 62.

Certain vehicle I/O pins support multiple protocols and signals and must be passed through a Vehicle I/O 80 for proper routing, which includes MUX/DEMUX. Because vehicle manufacturers can assign different communication protocol signals on the same pin, the Vehicle I/O 80 processes the signal and routes the signal to the proper communication protocol processors. The proper routing configurations can be controlled through a microprocessor 84 (see below). The Vehicle I/O 80 is capable of communicating in the various communication protocols.

CAN controller 78 controls the CAN communication protocols discussed above. There can be three separate CAN controllers 78 (High and Medium Speed and Single Wire) in the VDR. With three CAN controllers 78, the different CAN protocols can be better routed to proper CAN controller for faster information receiving and transmitting than with just one CAN controller 78. The CAN controller 78 communicates with the Vehicle I/O 80 and the processor 84. A person skilled in the art will recognize that there can be one, two or any amount of CAN controller 78 on the VDR as desired.

The processor 84 can be any processor that has enough processing power that is required by the VDR. Preferably, the processor 84 is the MOTOROLA MC68331. The processor 84 has the ability to provide mode programming 86, which can program the ECU by connecting different load resistors to a mode pin. The trigger button 22 is in communication with the processor 84 so that the processor can control the data gathering for the VDR. The trigger button 22 can be illuminated by the LED 96 and actuated by user 102.

Additionally, the processor 84 communicates with a real time clock 100, which retains time and date information without the need of external power. The real time clock 100 is part of the main board 28. It would be recognized by a person skilled in the art that the real time clock 100 can be integrated with the processor 84 or separate from it. Memory such as Flash 92 (boot, program, record) and SRAM 94 are provided to the processor 84 so that information can be loaded into the processor or FPGA 82 or the information can be stored for later retrieval.

The processor 84 also communicates with the FPGA 82. Although any FPGA can be used, an XILINX XC2S30 may be utilized. The FPGA 82 is a specially made digital semiconductor that can be used as a programmable logic device that can emulate new electrical circuits as needed by the user. By incorporating the FPGA 82, the VDR can be updated with new circuits without the need of providing the actual new circuits on the boards or replacing the current boards on the VDR. The FPGA 82 versatility can be used to provide new circuits for new communication protocols or other needs.

The FPGA 82 is also in communication with RJ-45 (88) with RS-232C, which provides serial communication with the host workstation 90. The host workstation 90 receives the information recorded by the VDR so that events can be analyzed. The host workstation is also designed to interact with the VDR to update the VDR with new information, new instructions, new software, data transfer, and to configure the VDR for use.

Figure 4:
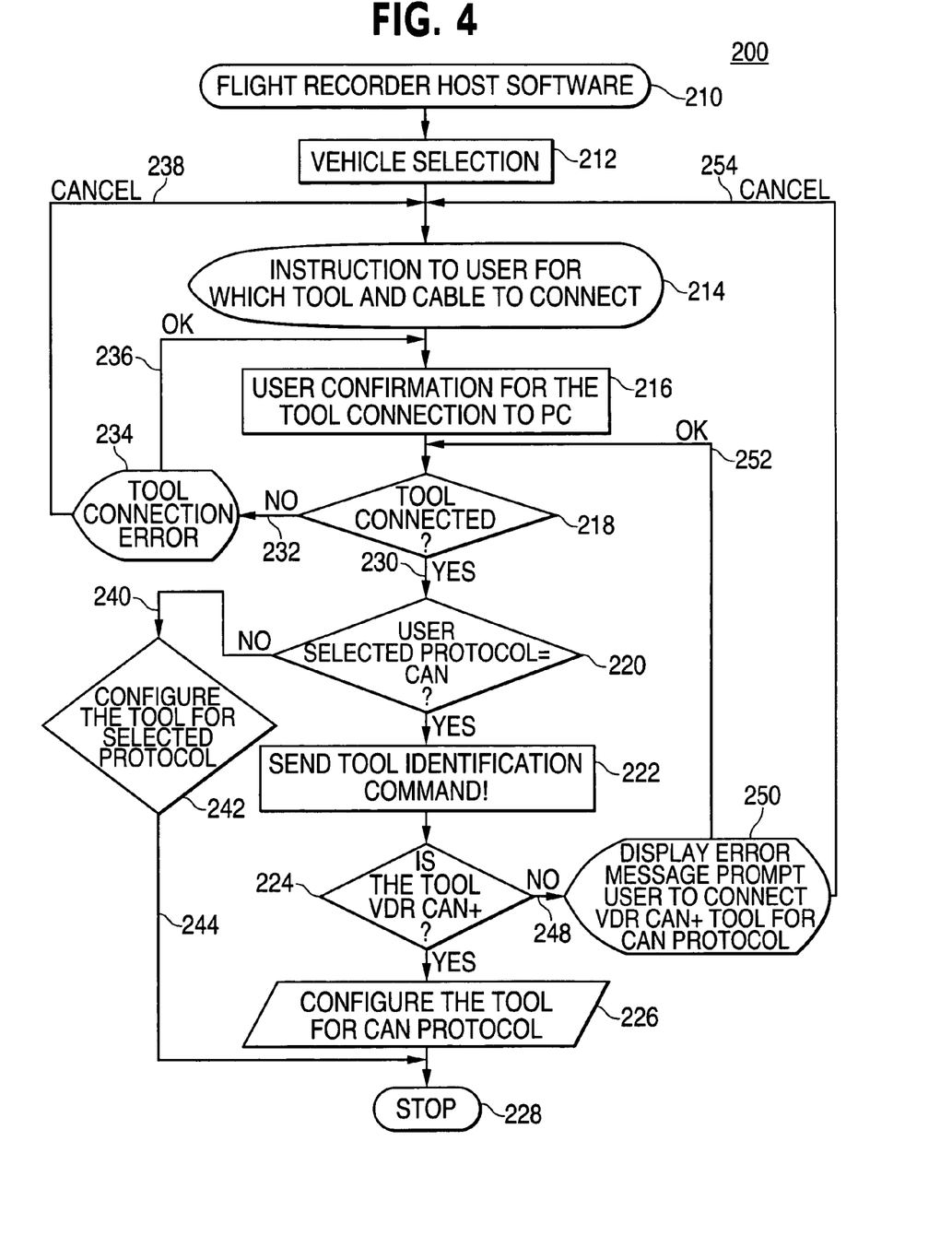
FIG. 4 is a diagram of an open ended method of the present invention.

FIG. 4 is a diagram 200 of an open ended method of the present invention. The host software 210 is stored on the host workstation and is capable of various functions discussed below. The host software may have different modules for different VDR types all inclusive and is updatable through known means so that the host workstation can communicate with any available VDR including the latest ones. The host software 210 can interact with the VDR through the communication port of the VDR, such as the RJ-45 cable and assist the user to configure the VDR for recording the desired event. The host software 210 is designed to be open ended so that it can communicate with various types of VDR, such as VDR with CAN, Diesel VDR, Heavy Duty VDR and other types of VDR and can communicate with previously released VDR and the latest models. As an example, this figure will illustrate steps for use with a VDR equipped with CAN. It will be recognized by a person skilled in the art that any type of VDR can be communicated with the host software 210 and that other communication is possible through other communication ports on the VDR, such as with communication hardware on the option card.

At step 212, the user selects the manufacturer of the vehicle that the VDR will be recording data from. Because communication protocols vary by manufacturers such as Cadillac, GM, Ford, Toyota and others and vary with the age of the vehicle and other factors, with the user selection, the host workstation can determine the correct type of VDR to use with the vehicle. Additionally, the user can selecting the recording parameters (discussed above).

At step 214, after the user selects the vehicle and other parameters, the host workstation provides instructions to the user as to which type of VDR and cable to connect via the host workstation's display or via voice commands. This step assists the user to select the right type of VDR and the associated cable to communicate with host workstation and the ECU. This step will decrease the time that the user spends on reviewing manuals for the correct VDR equipped with the correct protocol for the correct vehicle. Additionally, this will prevent errors due to the wrong VDR chosen by the user and only to be discovered later when no data can be downloaded after a lengthy field recording.

At step 216, the user confirms to the host workstation that the VDR is connected to the host workstation. Alternatively, the host workstation can skip step 216 and proceed directly to step 218 through automatically detecting that the VDR is connected. At step 218, the host software queries the connected VDR to see if it's properly connected to the host workstation. If yes 230, then at step 220, the software based on the user selected protocol, in this example CAN protocol, will at step 222 send a tool identification command to determine what type of VDR is connected. If no 232, then a tool connection error 234 is displayed or alerted via a sound signal. The user can select OK 236 and then connect the correct VDR or can select cancel 238 and start the process from the beginning. Additionally, if the user selection was not CAN 240, then the user can configure the VDR for the selected protocol 242 and proceed via 244 to stop 228.

At step 224, the software determines if the correct VDR with CAN is attached to the host workstation. If no 248, then the host workstation displays an error notification at step 250 and prompts the user to connect the VDR with CAN. Once the user connects the VDR with CAN, he can select OK 252, which returns the user to the prompt is the tool connected 218. Alternatively, the user can hit cancel 254, which returns the user to the screen 214, which instructs the user which VDR and cable to connect. If yes 246, then the software will configure the VDR for CAN protocol at step 226 and the desired recording instructions, such as when to record, for how long, what type of data to record, and other various possible options. After the configuration, then proceed to stop 228 and the VDR is ready to be attached to the ECU for recording.

In an alternative embodiment, the manual steps may be removed so that the process is automated as much as possible. At step 212, the user can select the manufacturer of the vehicle and the recoding parameters (discussed above). At step 214, the host workstation displays the type of VDR to connect to the host workstation. The software 210 can continuously query to see of a VDR is connected at step 218 and confirms if the correct tool is connected at steps 222 by sending the tool identification command. At step 224, the software confirms if it's the correct VDR attached to the host workstation. If it's not the correct VDR or no 248, then the tool at step 250 displays error message and prompts the user to connected the correct VDR. If the correct VDR is connected, then the software can configure the VDR based on the recording parameters previously established. The software 210 can also suggest to the user or defaults to an established parameter, such as recording for a certain amount of time after the a trigger on the VDR is depressed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A software recorded on a computer readable medium capable of causing a host workstation to perform steps comprising of:
    selecting a type of vehicle by a user that a user wants to record an event;
    instructing the user the type of vehicle data recorder with proper communication protocols to connect to the host workstation and to an electronic control unit based on the selected vehicle;
    detecting if the vehicle data recorder is attached to the host workstation;
    querying the vehicle data recorder with a tool identification command to identify if the correct type of vehicle data recorder is attached to the host workstation; and
    configuring the vehicle data recorder to record a desired event.

2. The software of claim 1, wherein detecting if the vehicle data recorder is attached can be done manually by user input or automatically through communication between the host workstation and the vehicle data recorder.

3. The software of claim 1, further comprising the step of:
    sending a tool connection error signal to the host workstation when the vehicle data recorder is not properly connected to the host workstation.

4. The software of claim 1, further comprising the step of:
    sending vehicle data recorder type error signal to the host workstation when the software detects that the incorrect type of vehicle data recorder is attached based on the vehicle selection.

5. The software of claim 1, wherein configuring the vehicle data recorder includes configuring to at least one of recording data for a predetermined period of time, recording data when a trigger button is actuated by the user, recording data for a period of time before and after the trigger is actuated by the user, any other time period and a combination thereof.

6. The software of claim 1, wherein at the querying step, the software can communicate with any type of vehicle data recorder that can communicate with any communication protocol communicated by the electronic control unit on a vehicle.

7. The software of claim 1, wherein the host workstation is a computing device.

8. The software of claim 7, wherein the computing device can be one of a personal computer, a personal digital assistant and a scan tool or any device that is capable of communicating with the vehicle data recorder.

9. The software of claim 4, further comprising the step of:
sending vehicle data recorder type error signal to the host workstation further includes informing the user the correct type of vehicle data recorder to attach to the host workstation.

10. A method of communicating with a vehicle data recorder, comprising:
selecting the desired vehicle type by a user that the user wants to record an event;
instructing the user the vehicle data recorder type equipped with proper communication protocols to connect to a host workstation and to an electronic control unit based on the selected vehicle type;
detecting a connection between the vehicle data recorder and the host workstation;
querying the vehicle data recorder with tool identification command to identify the type of vehicle data recorder attached to the host workstation; and
configuring the vehicle data recorder to record a desired event.

11. The method of communicating of claim 10, wherein detecting a connection can be done manually by user input or automatically through communication between the host workstation and the vehicle data recorder.

12. The method of communicating of claim 10, further comprising the step of:
sending a tool connection error signal to the host workstation when the vehicle data recorder is not properly connected to the host workstation.

13. The method of communicating of claim 10, wherein configuring the vehicle data recorder includes configuring to at least one of recording data for a predetermined period of time, recording data when a trigger button is actuated by a user, recording data for a period of time before and after the trigger is actuated by the user, any other time period and a combination thereof.

14. The method of communicating of claim 10, wherein at the querying step, the software can communicate with any type of vehicle data recorder that can communicate with any communication protocol communicated by the electronic control unit on a vehicle.

15. The method of communicating of claim 10, wherein the host workstation is a computing device.

16. The method of communicating of claim 15, wherein the computing device can be one of a personal computer, a personal digital assistant and a scan tool or any device that is capable of communicating with the vehicle data recorder.

17. A host workstation, comprising:
an input device to input information from a user;
an output device to communicate information;
a communication port to communicate with an external device;
a memory to store information;
a storage device to store information; and
a processor in communication with the storage, input and output devices, the communication port and the memory, wherein the host workstation is capable of performing functions comprising of:
selecting the desired vehicle type that the user wants to record an event;
instructing the user the vehicle data recorder type equipped with proper communication protocols to connect to the host workstation based on the selected vehicle type;
detecting for a connection between the vehicle data recorder and the host workstation;
querying the vehicle data recorder with tool identification command to identify the type of vehicle data recorder attached to the host workstation; and
configuring the vehicle data recorder to record a desired event.

18. The host workstation of claim 17, wherein detecting for a connection can be done manually by user input or automatically through communication between the host workstation and the vehicle data recorder.

19. The host workstation of claim 17, further comprising the step of:
sending a tool connection error signal to the host workstation when the vehicle data recorder is not properly connected to the host workstation.

20. The host workstation of claim 17, wherein configuring the vehicle data recorder includes configuring to at least one of recording data for a predetermined period of time, recording data when a trigger button is actuated by a user, recording data for a period of time before and after the trigger is actuated by the user, any other time period and a combination thereof.

21. The host workstation of claim 17, wherein at the querying step, the software can communicate with any type of vehicle data recorder that can communicate with any communication protocol communicated by the electronic control unit on a vehicle.

22. The host workstation of claim 17, wherein the host workstation is a computing device.

23. The host workstation of claim 22, wherein the computing device can be one of a personal computer, a personal digital assistant and a scan tool or any device that is capable of communicating with the vehicle data recorder.

24. A method of communicating with a vehicle data recorder, comprising:
selecting the desired vehicle type by a user that the user wants to record an event;
instructing the user the vehicle data recorder type equipped to connect to a host workstation based on the selected vehicle type;
automatically detecting a connection between the vehicle data recorder and the host workstation;
automatically querying the vehicle data recorder with tool identification command to identify the type of vehicle data recorder attached to the host workstation;
automatically selecting the software module that communicates with the vehicle data recorder; and
automatically configuring the vehicle data recorder to record a desired event.

25. The method of communicating of claim 24, further comprising selecting the recording parameter based on user preference.

* * * * *